United States Patent
Galhardo et al.

(10) Patent No.: US 9,955,679 B1
(45) Date of Patent: May 1, 2018

(54) LINE HOLDER SPOOL

(71) Applicants: Daniel Galhardo, Boulder, CO (US); Luke Uyeda, Los Angeles, CA (US)

(72) Inventors: Daniel Galhardo, Boulder, CO (US); Luke Uyeda, Los Angeles, CA (US)

(*) Notice: Subject to any disclaimer, the term of this patent is extended or adjusted under 35 U.S.C. 154(b) by 284 days.

(21) Appl. No.: 14/966,023

(22) Filed: Dec. 11, 2015

Related U.S. Application Data (60) Provisional application No. 62/090,915, filed on Dec. 12, 2014.

(51) Int. Cl.
*A01K 89/08* (2006.01)

(52) U.S. Cl.
CPC ............ *A01K 89/081* (2015.05); *A01K 89/08* (2013.01)

(58) Field of Classification Search
CPC ............... A01K 89/08; A01K 89/081
USPC .................................................. 242/317, 323
See application file for complete search history.

(56) References Cited

U.S. PATENT DOCUMENTS

| | | | | |
|---|---|---|---|---|
| 954,562 A * | 4/1910 | Cone | ........................... | 242/125.2 |
| 2,514,697 A * | 7/1950 | Ellis | ........................ | A01K 97/06 242/141 |
| 3,008,664 A * | 11/1961 | McCormick | ........... | A01K 89/00 242/118 |
| 3,039,226 A * | 6/1962 | Bagdonas | ............... | A01K 97/06 43/57.2 |
| 3,126,662 A * | 3/1964 | White | ..................... | A01K 97/06 242/402 |
| 4,030,228 A * | 6/1977 | Schaefers | ............... | A01K 97/06 43/57.2 |
| 4,082,235 A * | 4/1978 | Dauvergne | ............. | A01K 89/08 242/387 |
| 5,639,043 A * | 6/1997 | Baird | ...................... | B65H 59/02 242/125.3 |
| 8,028,948 B1 * | 10/2011 | Holt | ........................ | A01K 97/06 242/322 |
| 8,434,257 B2 * | 5/2013 | Arias | ...................... | A01K 97/06 43/4 |
| 8,522,474 B1 * | 9/2013 | Magnuson | ............. | A01K 97/06 43/54.1 |
| 2006/0000862 A1* | 1/2006 | Kawano | .................. | A01K 97/06 225/60 |
| 2011/0017862 A1* | 1/2011 | Hemkens | ................ | A01K 97/06 242/605 |

(Continued)

FOREIGN PATENT DOCUMENTS

WO   WO -8901285 A1 *   2/1989

*Primary Examiner* — Christopher R Harmon
(74) *Attorney, Agent, or Firm* — Emery L. Tracy (57) ABSTRACT

A line holder spool for holding an amount of line is provided. The spool comprises a first spool portion securable to a second spool portion. An annular, flexible line trapping mechanism having a first side and a second side is provided. The line trapping mechanism is releasably positioned between the first spool portion and the second spool portion with the first side facing the first spool portion and the second side facing the second spool portion. A first groove is formed in the first side if the line trapping mechanism. The line is windable within the first groove of the line trapping mechanism and the line trapping mechanism maintains the line from unwrapping from the spool. A portion of the line trapping mechanism is selectively movable outward from between the first spool portion and the second spool portion to access the line.

20 Claims, 13 Drawing Sheets

(56) References Cited

U.S. PATENT DOCUMENTS

2016/0044904 A1\* 2/2016 Tiller .................. A01K 97/06
242/405.1

\* cited by examiner

LINE HOLDER SPOOL

The present application claims benefit of priority from U.S. provisional patent application Ser. No. 62/090,915, filed Dec. 12, 2014, entitled "Line Holder Spool".

BACKGROUND OF THE INVENTION

1. Field of the Invention

This invention relates generally to line holder spool and, more particularly, the invention relates to a line holder spool having a line trapping mechanism which inhibits the fishing line from unwantedly unwrapping from the line holder spool.

2. Description of the Prior Art

Tenkara is the Japanese method of fly-fishing, which uses only a rod, line and fly and shines in mountain streams, where the long rod and light line provide the best possible fly presentation. Tenkara is also effective in a variety of waters, such as alpine lakes, or urban ponds for pan fish and bass. Basically, tenkara is the ideal setup for anyone looking for an intuitive and fire way to fly-fish, something to take along on a backpacking fishing trip or teaching kids the art of fly-fishing, without the complexities.

A line holder spool is a handy accessory for all fisher person, especially those doing tenkara. When fly fishing small streams, it is often necessary to walk along the stream bank to get to the next spot to fish. With a tenkara or other type of fishing rod, it is often necessary to collapse the rod if there are any trees or brush. A line holder spool allows the fisher person to keep the fly, tippet, and line attached to the rod thereby inhibiting the tangles created from wrapping the line around an object.

One problem, however, exists with conventional line holder spools. Regardless of how tightly the fisher person winds the fishing line about the line holder spool, the fishing line tends to unravel and unwind. In attempt to prevent this from happening, some will put an elastic band or the like over the line. Unfortunately, this is a temporary fix, at best, in that the elastic band tends to become lost or the elastic band moves from over the line during normal use allowing the line to unwind from the line holder spool.

SUMMARY

The present invention is a line holder spool for holding an amount of line. The line holder spool comprises a first spool portion and a second spool portion with the first spool portion securable to the second spool portion. An annular, flexible line trapping mechanism having a first side and a second side is provided. The line trapping mechanism is releasably positioned between the first spool portion and the second spool portion with the first side facing the first spool portion and the second side facing the second spool portion. A first groove is formed in the first side if the line trapping mechanism. The line is windable within the first groove of the line trapping mechanism and the line trapping mechanism maintains the line from unwrapping from the spool. A portion of the line trapping mechanism is selectively movable outward from between the first spool portion and the second spool portion to access the line.

In addition, the present invention includes a method for holding an amount of line. The method comprises providing a first spool portion, providing a second spool portion, securing the first spool portion to the second spool portion, providing an annular, flexible line trapping mechanism having a first side and a second side opposite the first side, releasably positioning the line trapping mechanism between the first spool portion and the second spool portion with the first side facing the first spool portion and the second side facing the second spool portion, forming a first groove in the first side if the line trapping mechanism, winding the line within the first groove of the line trapping mechanism, maintaining the line from unwrapping from the spool, and selectively moving a portion of the line trapping mechanism outward from between the first spool portion and the second spool portion to access the line.

The present invention further includes a line holder spool for holding an amount of line. The line holder spool comprises a first spool portion and a second spool portion with the first spool portion securable to the second spool portion. An annular, flexible line trapping mechanism having a first side and a second side opposite the first side is provided. The line trapping mechanism is releasably positioned between the first spool portion and the second spool portion with the first side facing the first spool portion and the second side facing the second spool portion. At least one tab member extends in a general direction outward from the line trapping mechanism and extending beyond a perimeter edge of the first spool portion and the second spool portion. A pair of finger holes is formed in the first spool portion and the second spool portion. A pair of finger hole inserts extend from the line trapping mechanism and receivable within the finger holes, the finger hole inserts constructed from an elastic, flexible material. A first groove is formed in the first side if the line trapping mechanism. The line is windable within the first groove of the line trapping mechanism with the line trapping mechanism maintaining the line from unwrapping from the spool. A portion of the line trapping mechanism is selectively movable outward from between the first spool portion and the second spool portion to access the line.

DETAILED DESCRIPTION OF THE PREFERRED EMBODIMENTS

Figure 1:
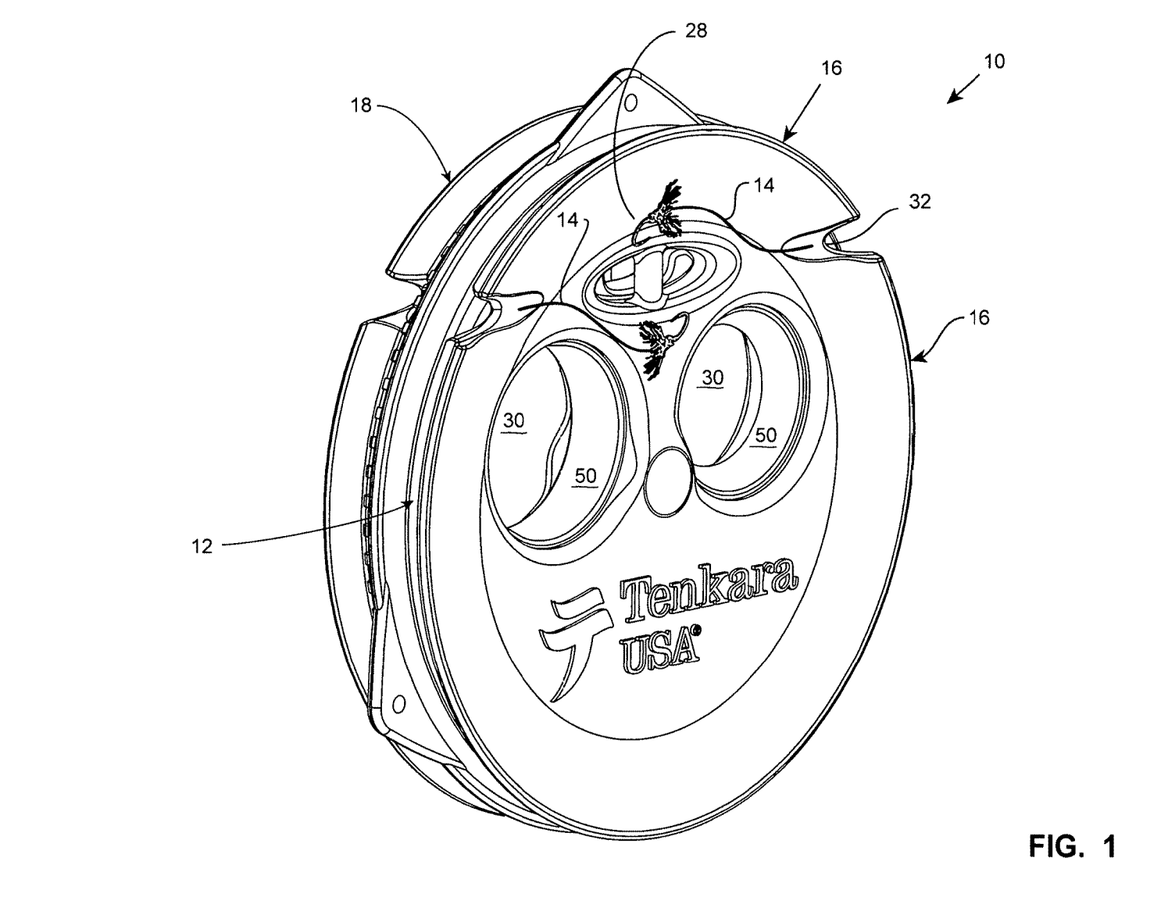
FIG. 1 is a front perspective view illustrating a line holder spool, constructed in accordance with the present invention, with the line holder spool having a first spool portion, a second spool portion, and a flexible third spool portion (line trapping mechanism) sandwiched between the first spool portion and the second spool portion.
Figure 2:
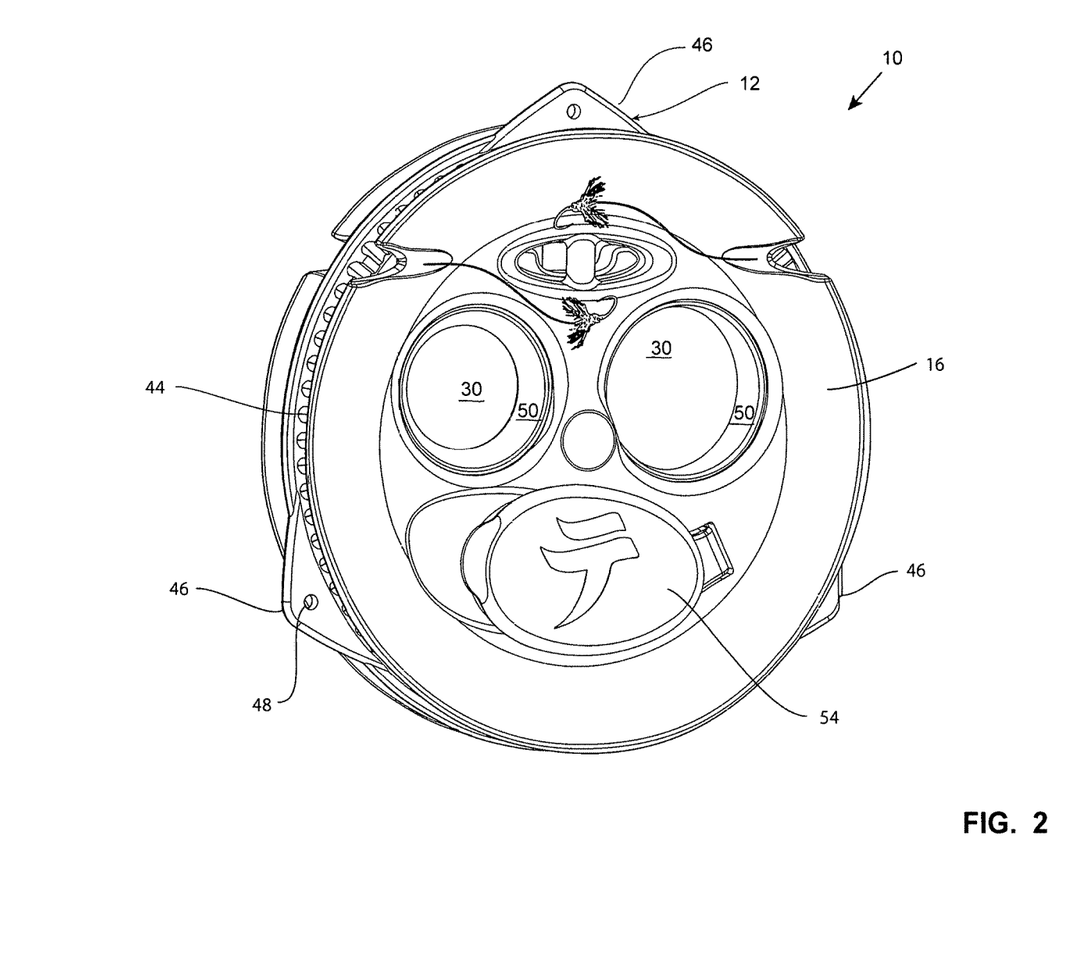
FIG. 2 is a rear perspective view illustrating the line holder spool, constructed in accordance with the present invention.
Figure 3:
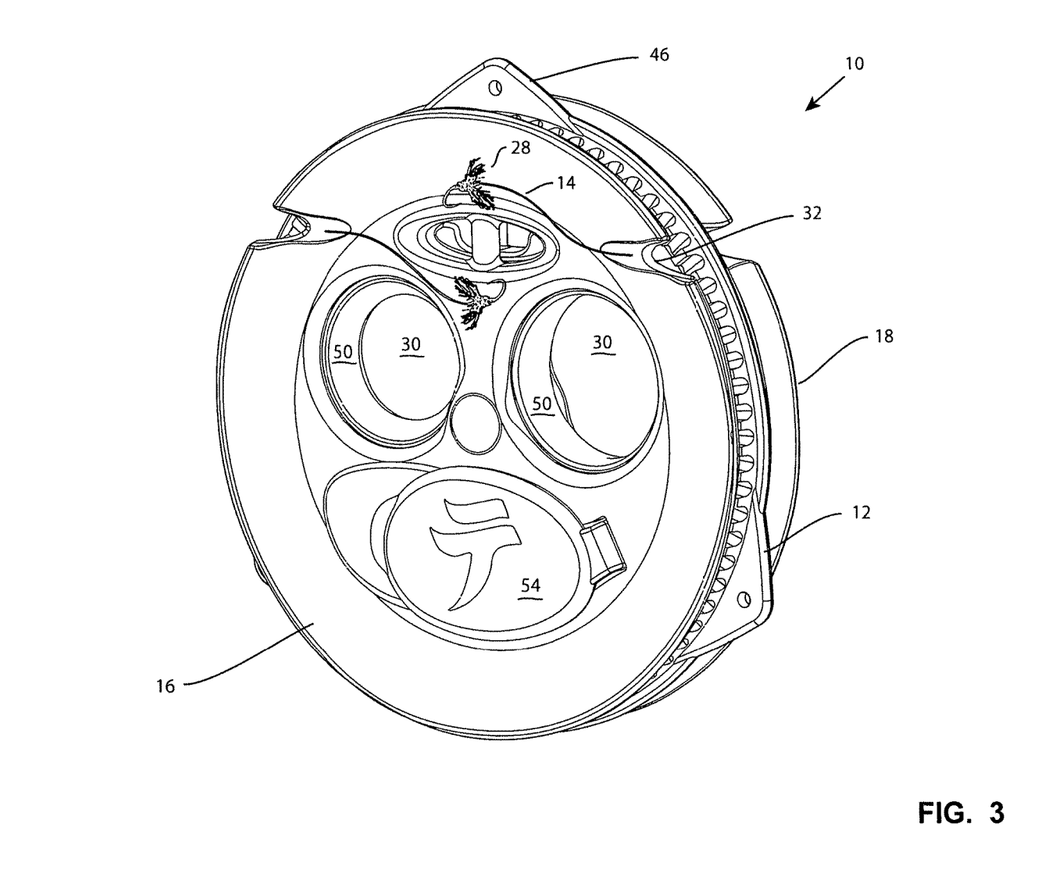
FIG. 3 is another rear perspective view illustrating the line holder spool, constructed in accordance with the present invention.
Figure 4:
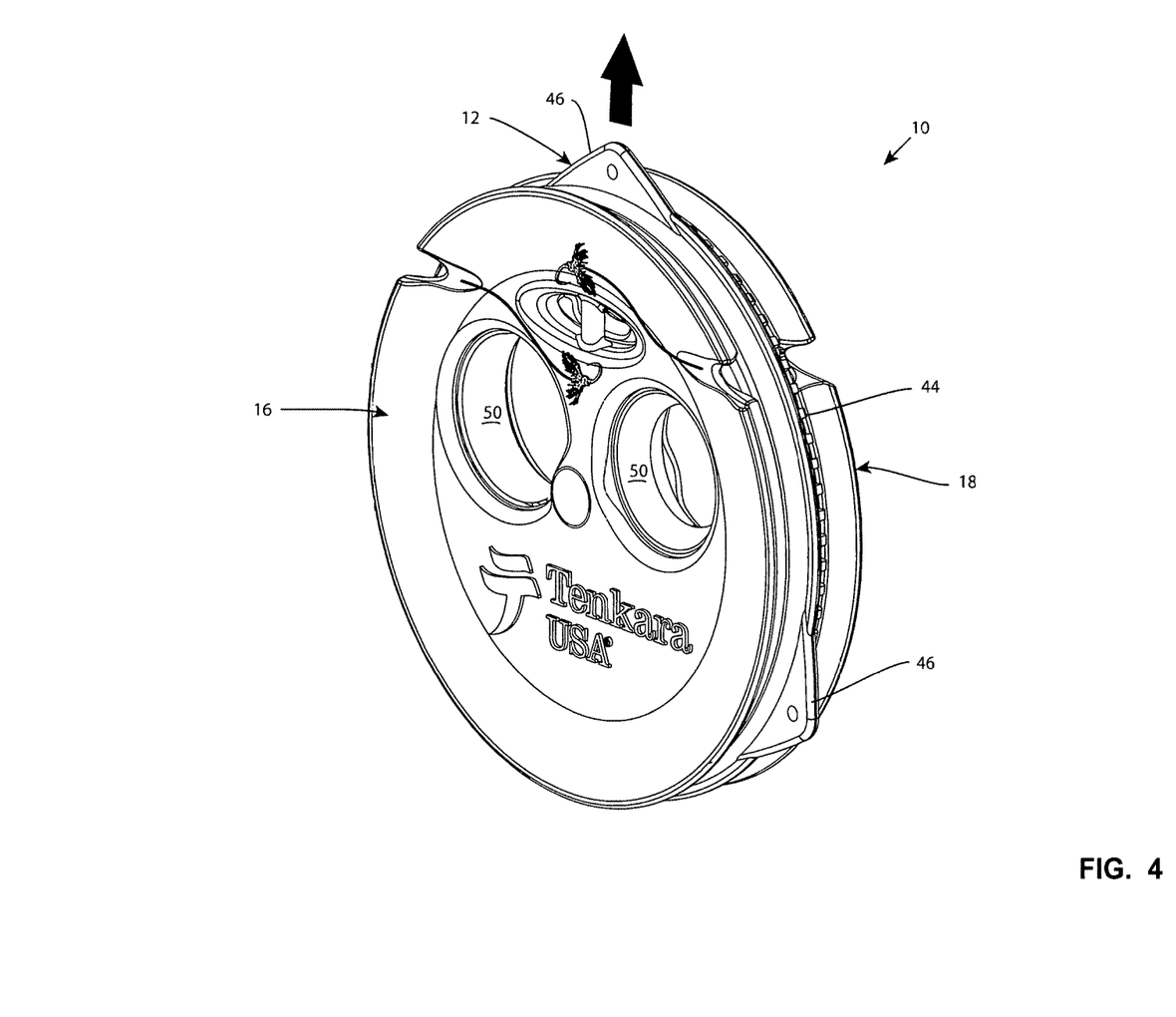
FIG. 4 is another front perspective view illustrating the line holder spool, constructed in accordance with the present invention, with an arrow indicating a direction for deforming the line trapping mechanism to release the fishing line.
Figure 5:
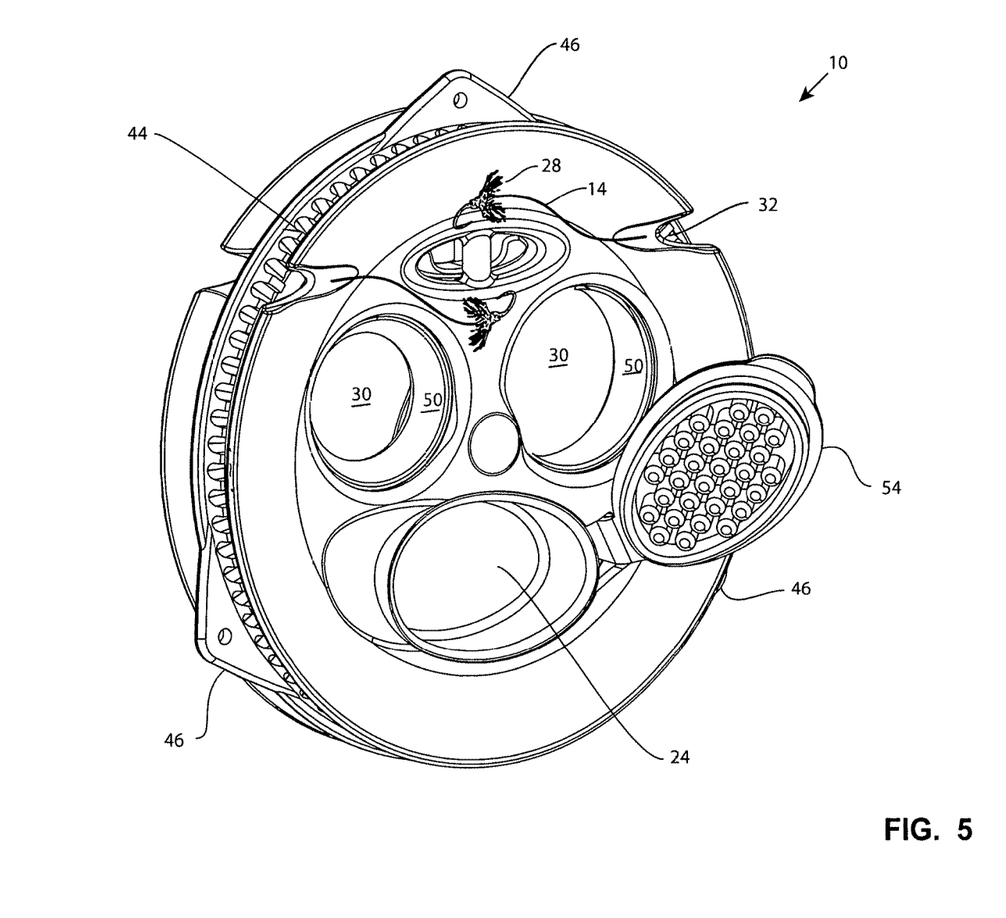
FIG. 5 is yet another rear perspective view illustrating the line holder spool, constructed in accordance with the present invention, with an integrated fly box being open for retrieving fly lures.
Figure 6:
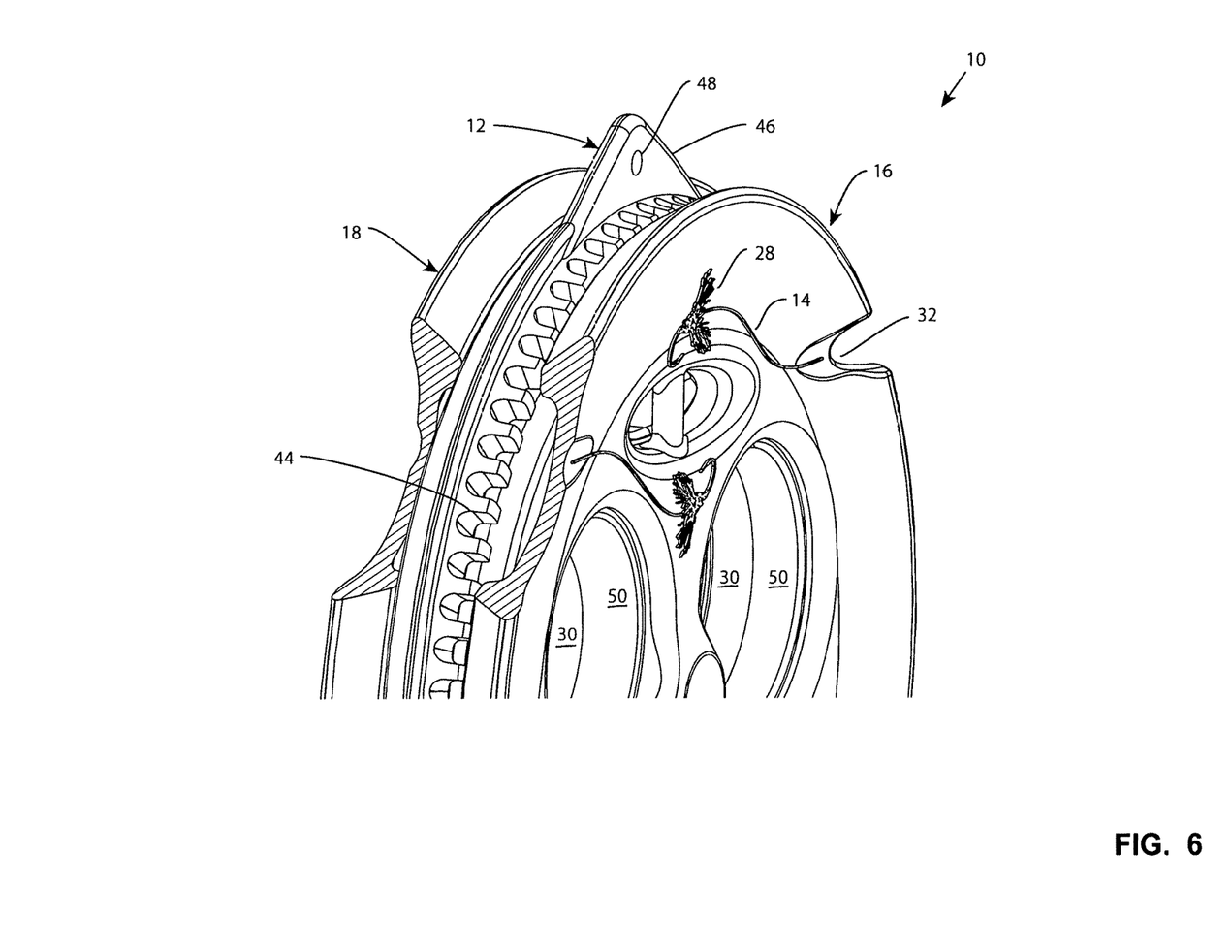
FIG. 6 is a cut-away perspective view illustrating the line holder spool, constructed in accordance with the present invention, with the line trapping mechanism sandwiched between the first spool portion and the second spool portion.
Figure 7:
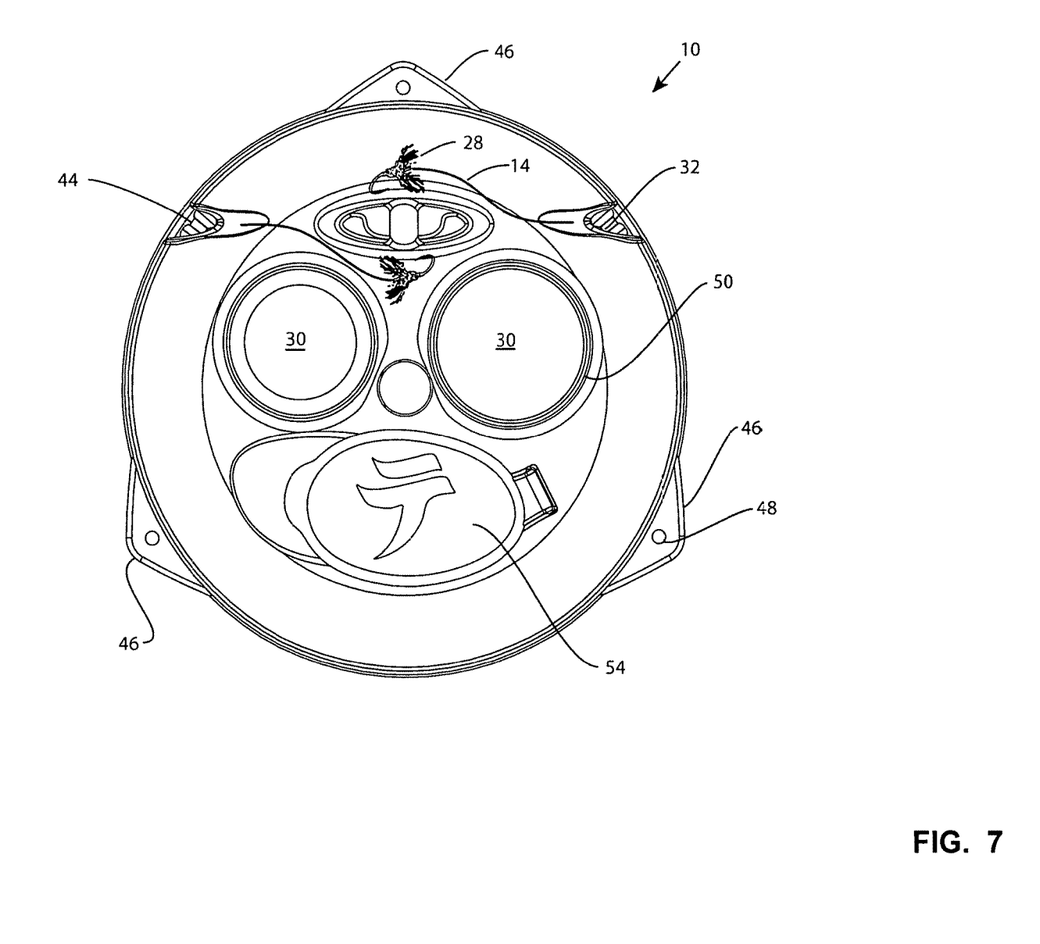
FIG. 7 is a bottom plan view illustrating the line holder spool, constructed in accordance with the present invention.
Figure 8:
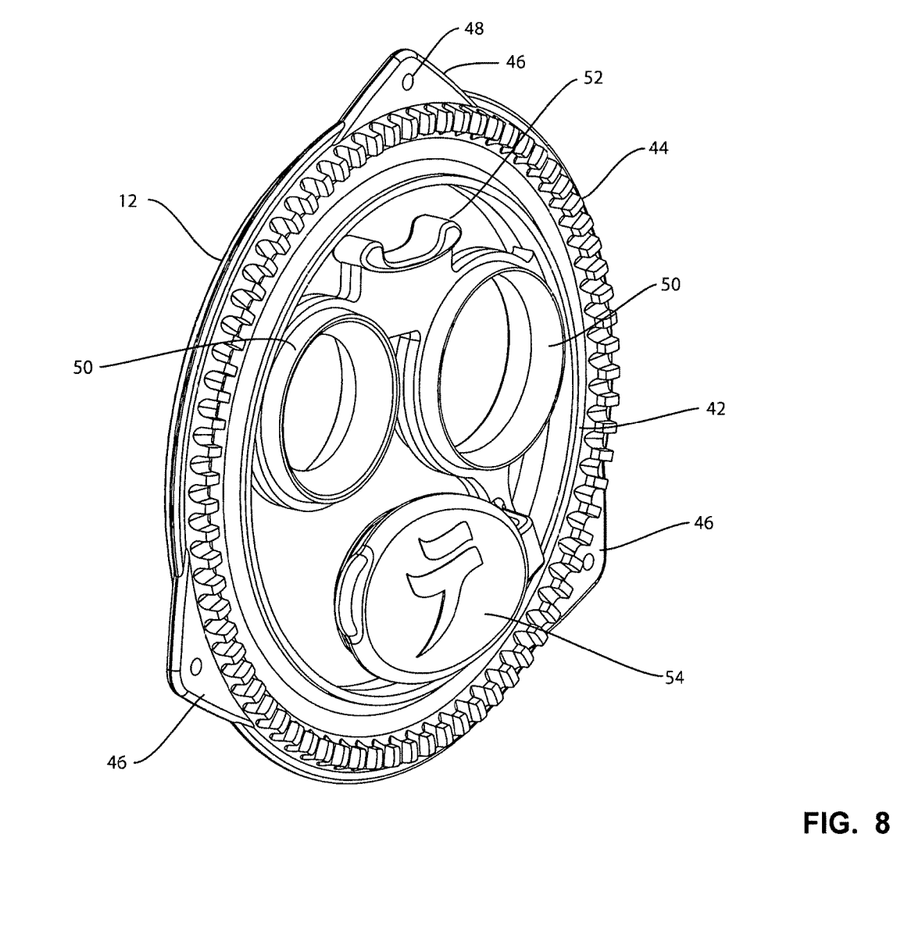
FIG. 8 is a rear perspective view illustrating the line trapping mechanism of the line holder spool, constructed in accordance with the present invention.
Figure 9:
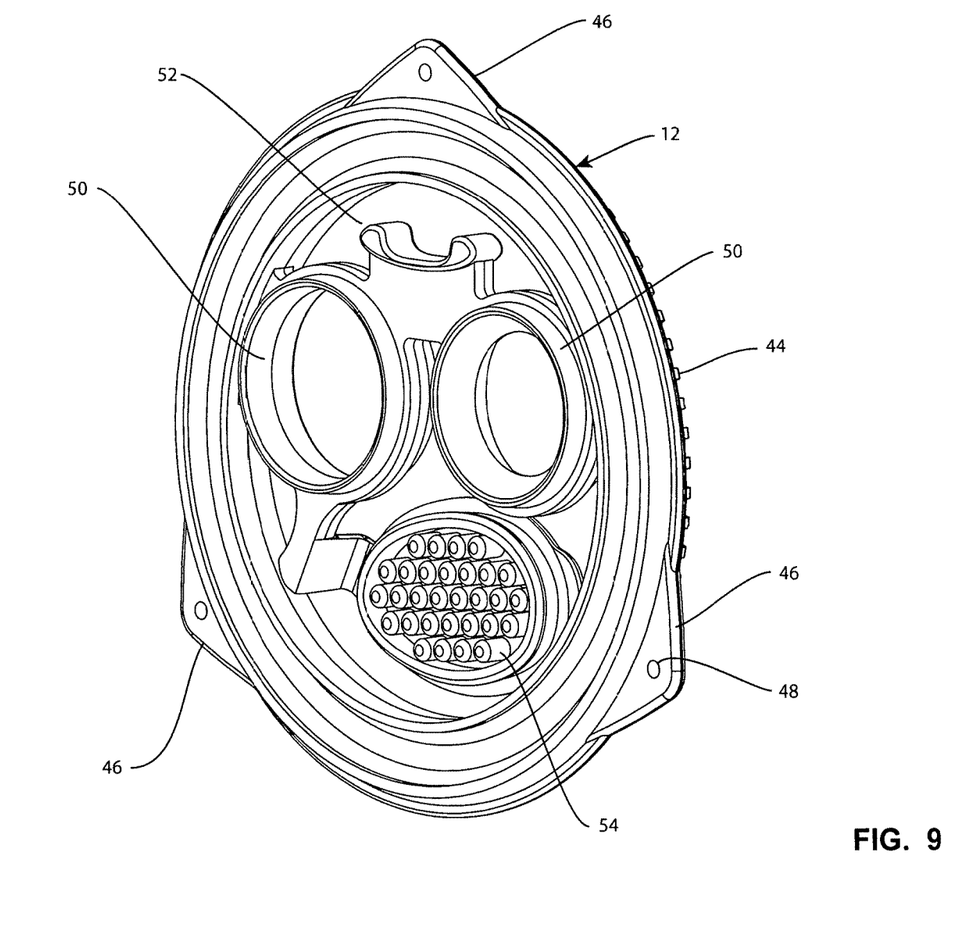
FIG. 9 is a front perspective view illustrating the line trapping mechanism of the line holder spool, constructed in accordance with the present invention.
Figure 10:
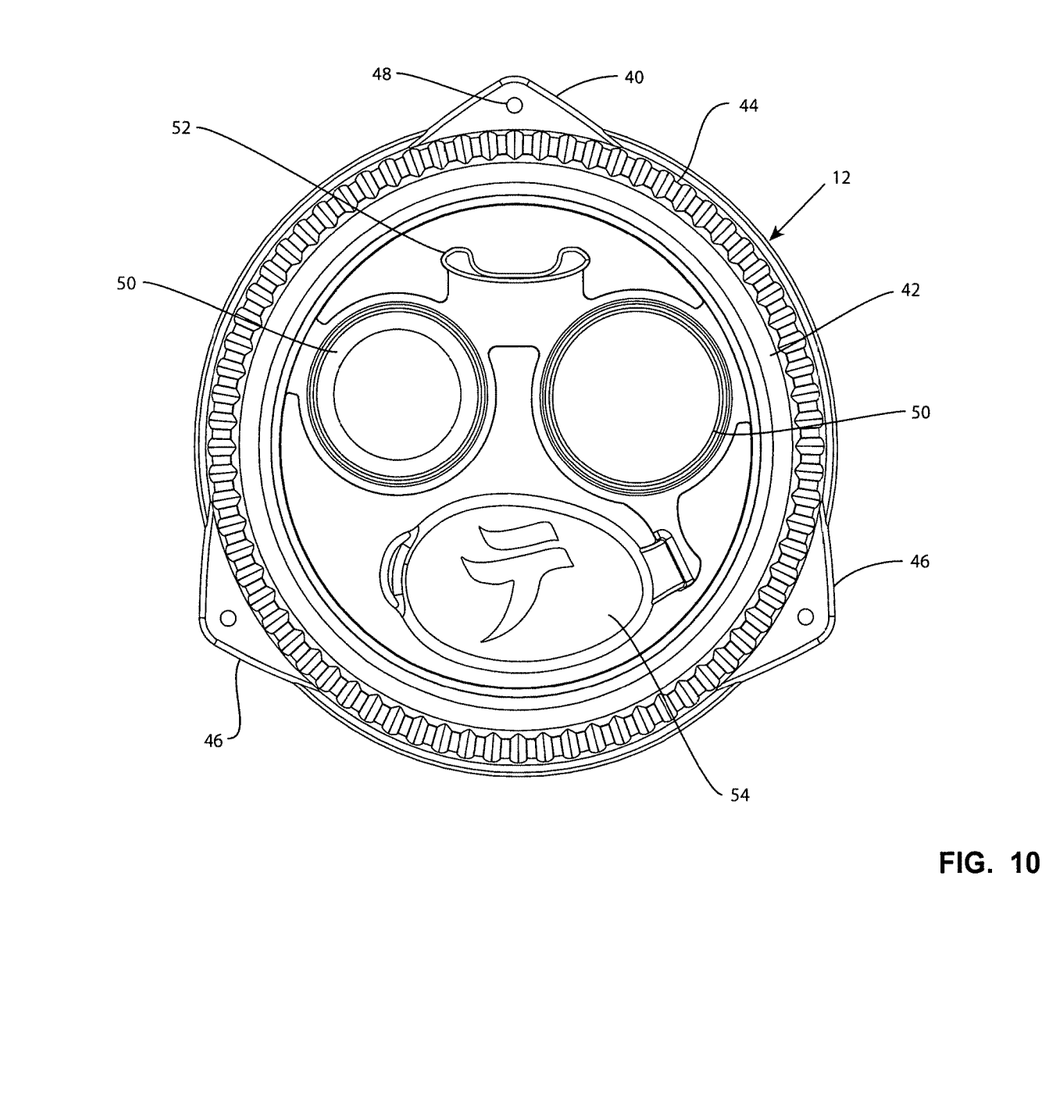
FIG. 10 is a bottom plan view illustrating the line trapping mechanism of the line holder spool, constructed in accordance with the present invention.
Figure 11:
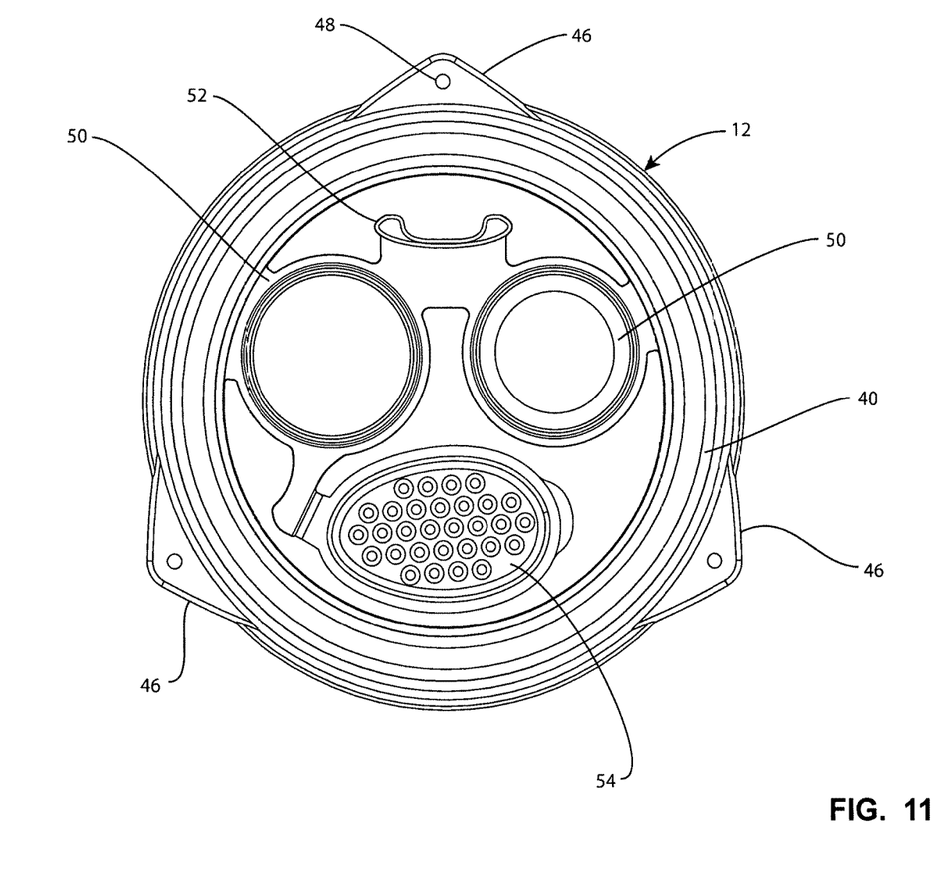
FIG. 11 is a top plan view illustrating the line trapping mechanism of the line holder spool, constructed in accordance with the present invention.
Figure 12:
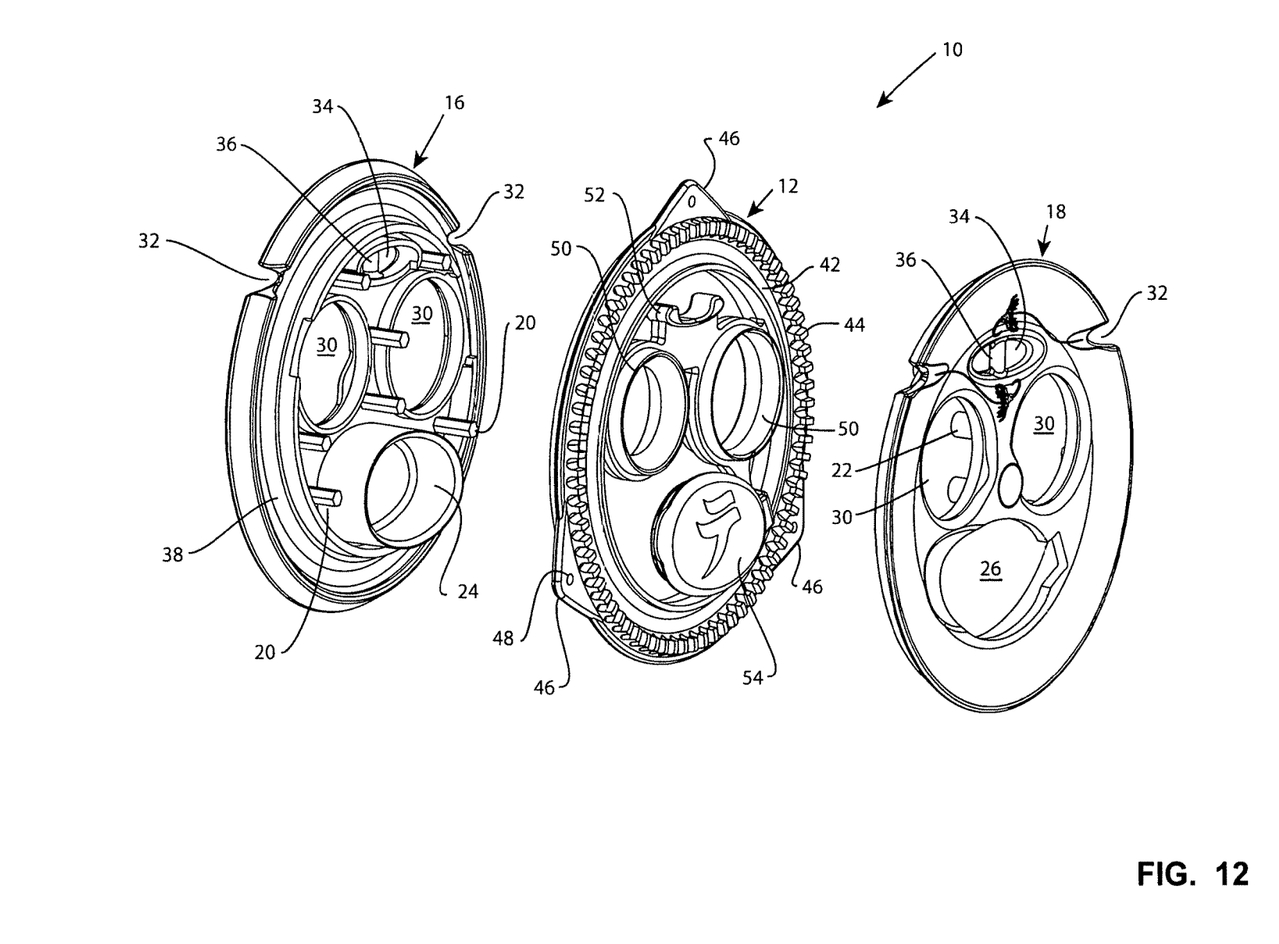
FIG. 12 is an exploded perspective view illustrating the line holder spool, constructed in accordance with the present invention.
Figure 13:
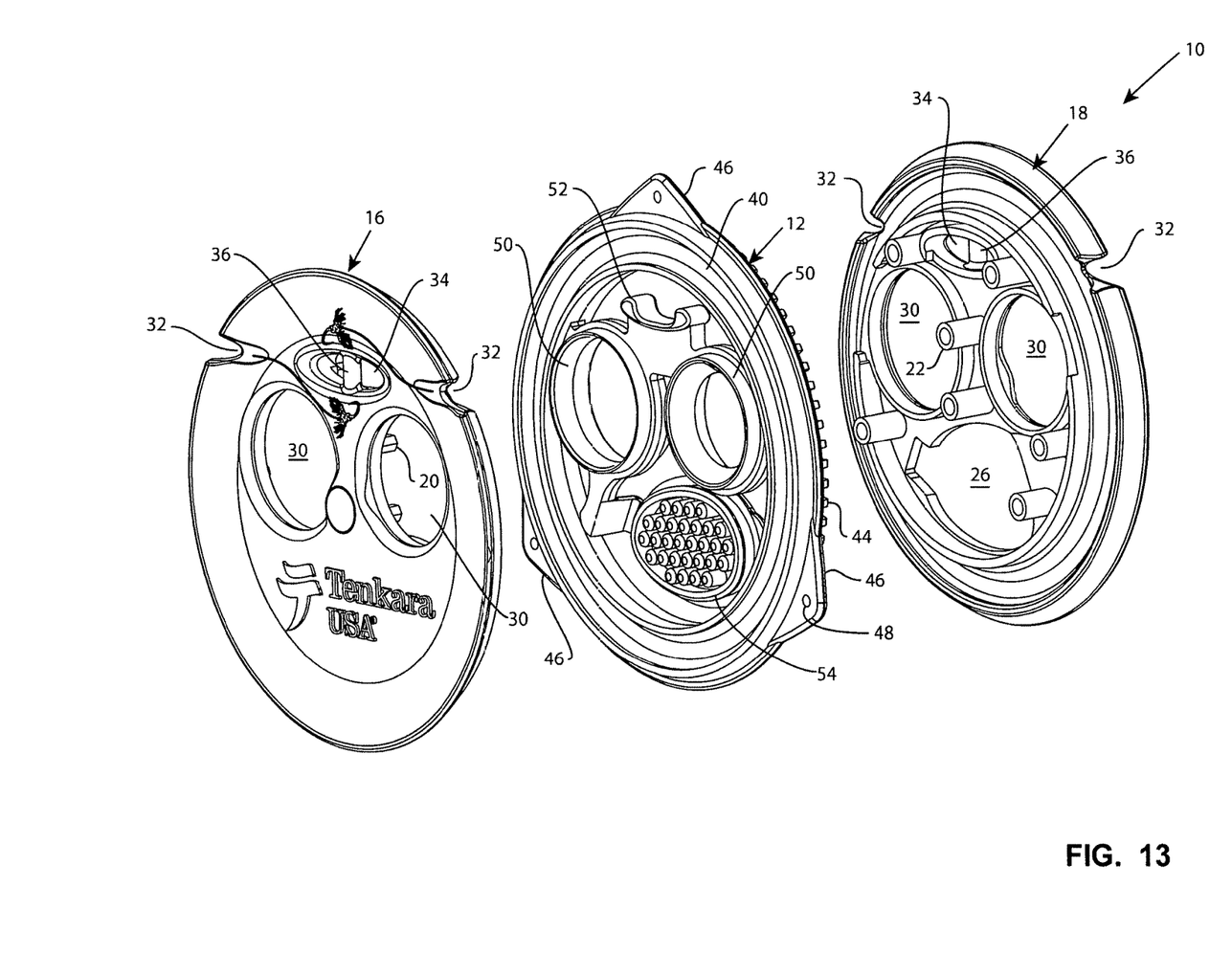
FIG. 13 is another exploded perspective view illustrating the line holder spool, constructed in accordance with the present invention.

As illustrated in FIGS. 1-13, the present invention is a line holder spool, indicated generally at 10, having a line trapping mechanism 12 which inhibits the fishing line 14 from unwrapping from the line holder spool. It should be noted that while the line holder spool 10 is described and illustrated herein as being used with fishing line 14, it is within the scope of the present invention for the line holder spool 10 to be used with other types of line, rope, cable, etc.

The line holder spool 10 of the present invention includes a spool having a first spool portion 16 and a second spool portion 18 holding a flexible third spool portion (line trapping mechanism 12) in between them. Preferably, the first spool portion 16 is releasably secured to the second spool portion 18 by interaction and friction between a plurality of posts 20 formed on the first spool portion 16 and a plurality of corresponding apertures 22 formed in the second spool portion 18. It should be noted that while the line holder spool 10 has been described and illustrated as having a first spool portion 16 releasably secured to the second spool portion 18, it is within the scope of the present invention for the first spool portion 16 to be fixedly secured to the second spool portion 18 and for the spool to be constructed without a separate first spool holder 16 and a second spool holder 18.

The first spool portion 16 of the spool of the line holder spool 10 of the present invention includes an integrated fly box 24. The fly box 24 is accessible to the fisher person through a fly box aperture 26 formed in the second spool portion 18 that aligns with the fly box 24 when the first spool portion 16 is releasably secured to the second spool portion 18. Releasably closing the fly box 24 and securing fly lures 28 therein will be discussed in further detail below.

In addition, the first spool portion 16 and the second spool portion 18 of the spool of the line holder spool 10 of the present invention have a pair of finger holes 30 formed therethrough. Preferably, the finger holes 30 are adjacent each other allowing the fisher person to insert one finger in each finger hole 30 thereby inhibiting the line holder spool 10 from rotating while loading and unloading fishing line 14, as will be described in further detail below.

The first spool portion 16 and the second spool portion 18 of the spool of the line holder spool 10 of the present invention additionally each have at least one notch 32 formed in a perimeter edge for guiding and positioning the fishing line 14 for winding around the line holder spool 10. In a preferred embodiment, each of the first spool portion 16 and the second spool portion 18 have a pair of notches 32 with the notches 32 of the first spool portion 16 aligning with the notches 32 of the second spool portion 18 when the first spool portion 16 is secured to the second spool portion 18.

Furthermore, the first spool portion 16 and the second spool portion 18 of the spool of the line holder spool 10 of the present invention each has a fly hook holding aperture 34 for holding a fly hook 28. The fly hook holding aperture 34 preferably has a cross bar 36 allowing the fisher person to releasably hook the fly hook 14 within the fly hook holding aperture 34.

Adjacent the perimeter edge of each of the first spool portion 16 and the second spool portion 18 of the spool of the line holder spool 10 of the present invention is an annular groove 38 for receiving the line trapping mechanism 12. When the first spool portion 16 is secured to the second spool portion 18, the line holding mechanism 12 is secured within the annular grooves 38 of the first spool portion 16 and the second spool portion 18.

The line trapping mechanism 12 of the line holder spool 10 of the present invention is preferably constructed of an elastic, flexible material formed as an annular member having a first side and a second side opposite the first side. A first groove 40 is formed in the first side of the annular member 12 and a second groove 42 is formed in the second side of the annular member 12 with the first groove 40 and the second groove 42 defined by an outer wall and an inner wall. In one embodiment, at least a portion of the outer wall can be formed with teeth 44 allowing the fishing line 14 to be more easily wound and unwound from the line holder spool 10, as will be described in further detail below.

In addition, in an embodiment of the present invention, the line trapping mechanism 12 of the line holder spool 10 of the present invention has at least one tab member 46 extending in a general direction outward from the outer wall of the line trapping mechanism 12. Preferably, the line trapping mechanism 12 has three equally spaced tab members 46 extending from the outer wall. By pulling the tab member 46 in a generally outward direction, the tab member 46 allows the fisher person to deform the line trapping mechanism 12 to more easily access the line 14 wound around the line holder spool 10. In a preferred embodiment, the tab member 46 can include an aperture 48 for connecting, the fine holder spoon to an object.

Additionally, in a preferred embodiment, the line trapping mechanism 12 of the line holder spool 10 of the present invention includes finger hole inserts 50 receivable within the finger holes 30 of the first spool portion 16 and the second spool portion 18. The finger hole inserts 50 provide comfort and grip for the fisher person during use of the line holder spool 10. Also, the finger hole inserts 50, being constructed from an elastic, flexible material, allow the line holder spool 10 to interact and engage the handle of the fishing rod when the fisher person slides the line holder spool 10 over the rod during transport and/or storage.

Furthermore, in still another embodiment of the present invention, the line trapping mechanism 12 of the line holder spool 10 of the present invention includes a hook aperture insert 52 receivable within the fly hook holding aperture 34. The hook aperture inserts 52 allow the fish hooks 28 to be releasably secured in a more secure manner.

Further yet, in a preferred embodiment, the line trapping mechanism 12 of the line holder spool 10 of the present invention includes a tackle box cover 54 for selectively covering the tackle box 24. The tackle box cover 54, in a closed manner, is positioned within the fly box, aperture 26 and releasably securable over the tackle box 24 and held in place by friction or the like.

The manner and use of the line holder spool of the present invention will now be described. When the fisher person wishes to move fishing positions or store his or her equipment, the fisher person will need to wind the line onto a spool. Now, grasping the line holder spool 10, with a finger in each finger hole 30, the fisher person positions the fish hook 28 in one of the fly hook holding apertures 34, either around one of the cross bars 36, in the hook aperture insert 52, or otherwise. Next, positioning the fishing line 14 in one of the notches 32 formed on either the first spool portion 16 or the second spool portion 18, the user wraps the fishing line 14 around the spool past the outer wall of the line trapping mechanism 12 and into the first groove 38 or second groove 40 of the line trapping mechanism 12. At the end of the fishing line 14, a small portion of the fishing line 14 can be left outside either the outer wall of the line trapping mechanism 12 for the user to grasp during the unwinding process. To unwind, the user can simply grasp the fishing line 14, urging the fishing line 14 past the outer wall as they unwind. Should the end of the fishing line 14 be trapped inside the line trapping mechanism 12 and not easily found, the user can pull one of the tab members 46 to deform the line trapping mechanism 12 such that the outer wall is beyond the perimeter edge of the spool and the line 14 is revealed. Once removed, the fishing line 14 can be secured to the fishing rod and used by fisher person during fishing activities.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A line holder spool for holding an amount of line, the line holder spool comprising:
   a first spool portion;
   a second spool portion, the first spool portion securable to the second spool portion;
   an annular, flexible line trapping mechanism having a first side and a second side opposite the first side, the line trapping mechanism releasably positioned between the first spool portion and the second spool portion with the first side facing the first spool portion and the second side facing the second spool portion; and
   a first groove formed in the first side of the line trapping mechanism;
   wherein the line is windable within the first groove of the line trapping mechanism;
   wherein the line trapping mechanism maintains the line from unwrapping from the spool; and
   wherein a portion of the line trapping mechanism is selectively movable outward from between the first spool portion and the second spool portion to access the line.

2. The line holder spool of claim 1 wherein the line is selected from the group consisting of fishing line, rope, and cable.

3. The line holder spool of claim 1 wherein the first spool portion is releasably securable to the second spool portion.

4. The line holder spool of claim 3 wherein the first spool portion is releasably secured to the second spool portion by interaction and friction between a plurality of posts formed on the first spool portion and a plurality of corresponding apertures formed in the second spool portion.

5. The line holder spool of claim 1 wherein the first spool portion and the second spool portion are integrally constructed.

6. The line holder spool of claim 1 and further comprising:
   a tackle box formed in the first spool portion;
   a tackle aperture formed in the second spool portion and alignable with the tackle box; and
   a tackle box cover for selectively covering the tackle box;
   wherein the tackle box cover is releasably securable over the tackle box.

7. The line holder spool of claim 1 and further comprising:
   a pair of finger holes formed in the first spool portion and the second spool portion; and
   a pair of finger hole inserts extending from the line trapping mechanism and receivable within the finger holes, the finger hole inserts constructed from an elastic, flexible material.

8. The line holder spool of claim 1 and further comprising:
   at least one notch formed in a perimeter edge of the first spool portion and the second spool portion.

9. The line holder spool of claim 8
   wherein the at least one notch is a pair of notches formed in the first spool portion and the second spool portion, the notches of the first spool portion aligned with the notches of the second spool portion when the first spool portion is secured to the second spool portion.

10. The line holder spool of claim 1 and further comprising:
    a fly hook holding aperture formed in the first spool portion and the second spool portion; and
    a hook aperture insert extending from the line trapping mechanism and receivable within the fly hook holding aperture.

11. The line holder spool of claim 10 and further comprising:
    a cross bar formed in the fly hook holding aperture for releasably hooking the fly hook within the fly hook holding apparatus.

12. The line holder spool of claim 1 and further comprising:
    an annular groove formed in the first spool portion and the second spool portion near a perimeter edge;
    wherein the annular groove receives the line trapping mechanism upon securing the first spool portion and the second spool portion together.

13. The line holder spool of claim 1 and further comprising:
    a second groove formed in the second side of the line trapping mechanism.

14. The line holder spool of claim 1 wherein the first groove is defined by an inner wall and an outer wall, wherein at least a portion of the outer wall has a plurality of teeth.

15. The line holder spool of claim 1 and further comprising:
    at least one tab member extending in a general direction outward from the line trapping mechanism and extending beyond a perimeter edge of the first spool portion and the second spool portion.

16. The line holder spool of claim 15 wherein the line trapping mechanism has three equally spaced tab members extending therefrom.

17. A method for holding an amount of line, the method comprising:
providing a first spool portion;
providing a second spool portion;
securing the first spool portion to the second spool portion;
providing an annular, flexible line trapping mechanism having a first side and a second side opposite the first side;
releasably positioning the line trapping mechanism between the first spool portion and the second spool portion with the first side facing the first spool portion and the second side facing the second spool portion;
forming a first groove in the first side of the line trapping mechanism;
winding the line within the first groove of the line trapping mechanism;
maintaining the line from unwrapping from the spool; and
selectively moving a portion of the line trapping mechanism outward from between the first spool portion and the second spool portion to access the line.

18. A line holder spool for holding an amount of line, the line holder spool comprising:
a first spool portion;
a second spool portion, the first spool portion securable to the second spool portion;
an annular, flexible line trapping mechanism having a first side and a second side opposite the first side, the line trapping mechanism releasably positioned between the first spool portion and the second spool portion with the first side facing the first spool portion and the second side facing the second spool portion;
at least one tab member extending in a general direction outward from the line trapping mechanism and extending beyond a perimeter edge of the first spool portion and the second spool portion;
a pair of finger holes formed in the first spool portion and the second spool portion;
a pair of finger hole inserts extending from the line trapping mechanism and receivable within the finger holes, the finger hole inserts constructed from an elastic, flexible material; and
a first groove formed in the first side of the line trapping mechanism;
wherein the line is windable within the first groove of the line trapping mechanism;
wherein the line trapping mechanism maintains the line from unwrapping from the spool; and
wherein a portion of the line trapping mechanism is selectively movable outward from between the first spool portion and the second spool portion to access the line.

19. The line holder spool of claim 18 wherein the first groove is defined by an inner wall and an outer wall, wherein at least a portion of the outer wall has a plurality of teeth.

20. The line holder spool of claim 18 and further comprising:
a fly hook holding aperture formed in the first spool portion and the second spool portion;
a hook aperture insert extending from the line trapping mechanism and receivable within the fly hook holding aperture; and
a cross bar formed in the fly hook holding aperture for releasably hooking the fly hook within the fly hook holding apparatus.

* * * * *